US012619294B2

(12) United States Patent
Barton et al.

(10) Patent No.: US 12,619,294 B2
(45) Date of Patent: May 5, 2026

(54) SYSTEM AND METHOD FOR CONTROLLING AN APPLIANCE WITH A LOSS OF POWER

(71) Applicant: Haier US Appliance Solutions, Inc., Wilmington, DE (US)

(72) Inventors: Tyler Barton, Clarksville, IN (US); Craig Edward Wicke, Louisville, KY (US); Steven Michael Recio, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/644,806

(22) Filed: Apr. 24, 2024

(65) Prior Publication Data

US 2025/0335014 A1     Oct. 30, 2025

(51) Int. Cl.
*G06F 1/30* (2006.01)
*G06F 1/28* (2006.01)
(52) U.S. Cl.
CPC . *G06F 1/30* (2013.01); *G06F 1/28* (2013.01)
(58) Field of Classification Search
CPC .................................... G06F 1/28; G06F 1/30
See application file for complete search history.

(56) References Cited

U.S. PATENT DOCUMENTS

| | | | |
|---|---|---|---|
| 6,175,927 B1 * | 1/2001 | Cromer | G06F 1/28 |
| | | | 710/200 |
| 8,417,995 B2 | 4/2013 | Davy et al. | |
| 9,946,610 B2 | 4/2018 | Kinoshita | |
| 10,552,311 B2 | 2/2020 | Edgington et al. | |
| 10,599,503 B2 * | 3/2020 | Rahmanian | G06F 1/30 |
| 2017/0052515 A1 * | 2/2017 | Meusburger | D06F 34/05 |
| 2025/0118999 A1 * | 4/2025 | Williams | H02J 50/90 |

FOREIGN PATENT DOCUMENTS

| | | |
|---|---|---|
| DE | 3732184 C1 | 2/1989 |
| EP | 0798624 A2 | 10/1997 |

* cited by examiner

*Primary Examiner* — Raymond N Phan
(74) *Attorney, Agent, or Firm* — Dority & Manning, P.A.

(57) ABSTRACT

A power loss control system for an appliance is provided. The power loss control system includes an AC presence detector configured to provide an AC presence signal indicative of a presence of an AC supply power. The power loss control system further includes a timing circuit configured to provide a timing signal indicative of a power loss interrupt time. The power loss control system further includes a controller configured to determine an operating mode of the appliance based at least in part on the AC presence signal indicating a power loss event and based at least in part on the timing signal.

18 Claims, 7 Drawing Sheets

400

410

AC Line Present?

Yes

412

Reset Brownout Timer

No

420

Brownout Timer > Power Loss Time Period

425

Yes

430

Turn Off High Power Loads

No

432

Save Mode Data

End

600

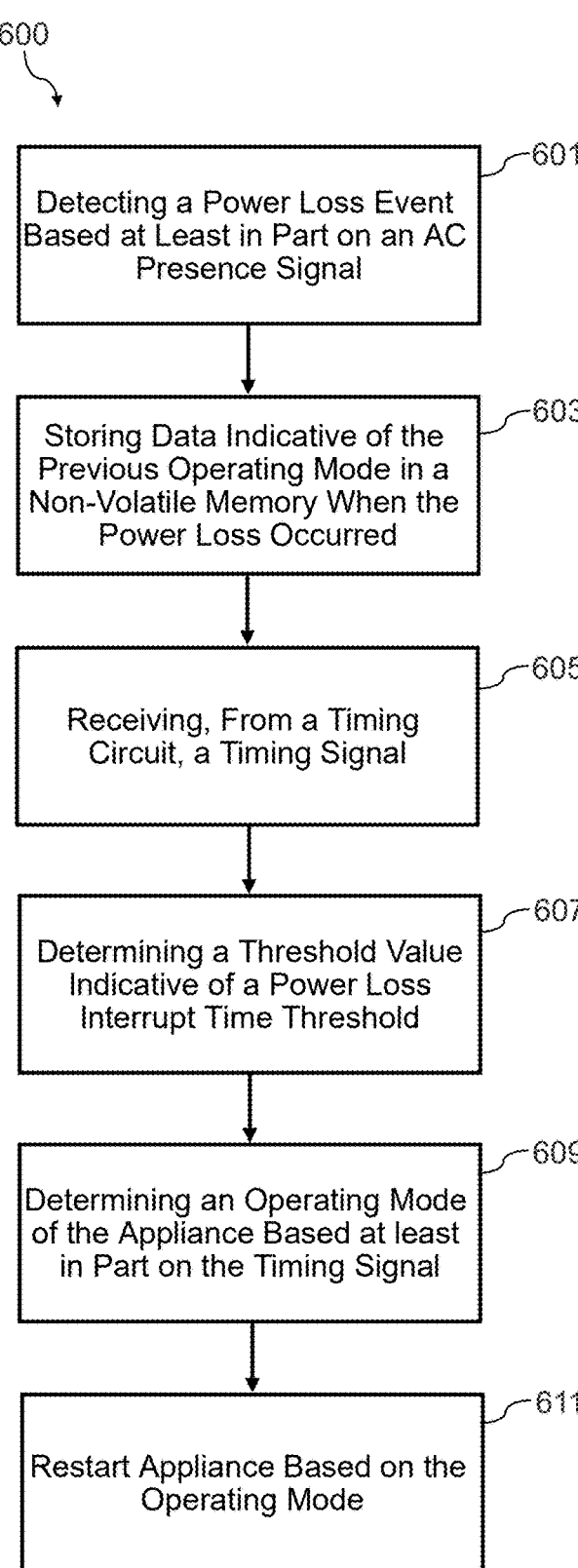

601

Detecting a Power Loss Event Based at Least in Part on an AC Presence Signal

603

Storing Data Indicative of the Previous Operating Mode in a Non-Volatile Memory When the Power Loss Occurred

605

Receiving, From a Timing Circuit, a Timing Signal

607

Determining a Threshold Value Indicative of a Power Loss Interrupt Time Threshold

609

Determining an Operating Mode of the Appliance Based at least in Part on the Timing Signal

611

Restart Appliance Based on the Operating Mode

FIG. 6

SYSTEM AND METHOD FOR CONTROLLING AN APPLIANCE WITH A LOSS OF POWER

FIELD

Example aspects of the present disclosure relate generally to domestic appliances and more particularly to recovering the mode of a domestic appliance after a power loss event has occurred.

BACKGROUND

Domestic appliances may include appliances such as refrigerators, dishwashers, microwave ovens, cooktops, ovens, washing machines, dryers, water heaters, water filters or purifiers, air conditioners, space heaters, or any other household appliance which performs similar functions. These appliances may require a constant power source in order to operate. However, interruptions to the main voltage at the outlet may occur for many reasons (e.g., brownouts, blackouts, etc.)

SUMMARY

Aspects and advantages of embodiments of the present disclosure will be set forth in part in the following description, or can be learned from the description, or can be learned through practice of the embodiments.

One example aspect of the present disclosure is directed to a power loss control system for an appliance. The power loss control system includes an AC presence detector configured to provide an AC presence signal indicative of a presence of an AC supply power. The power loss control system further includes a timing circuit configured to provide a timing signal indicative of a power loss interrupt time. The power loss control system further includes a controller configured to determine an operating mode of the appliance based at least in part on the AC presence signal indicating a power loss event and based at least in part on the timing signal.

Another example aspect of the present disclosure is directed to a method for restarting an appliance after a power loss event. The method includes receiving, from a timing circuit, a timing signal indicative of a power loss interrupt time. The method further includes determining an operating mode of the appliance based at least in part on the power loss interrupt time. The method further includes restarting the appliance based on the operating mode.

Another example aspect of the present disclosure is directed to an appliance. The appliance includes a power loss control system. The power loss control system includes an AC presence detector configured to provide an AC presence signal indicative of a presence of an AC supply power. The power loss control system further includes a timing circuit configured to provide a timing signal indicative of a power loss interrupt time. The power loss control system further includes a controller configured to determine an operating mode of the appliance based at least in part on the AC presence signal indicating a power loss event and based at least in part on the timing signal.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts a flowchart of an example method for restarting an appliance after a power loss event.

Figure 1:
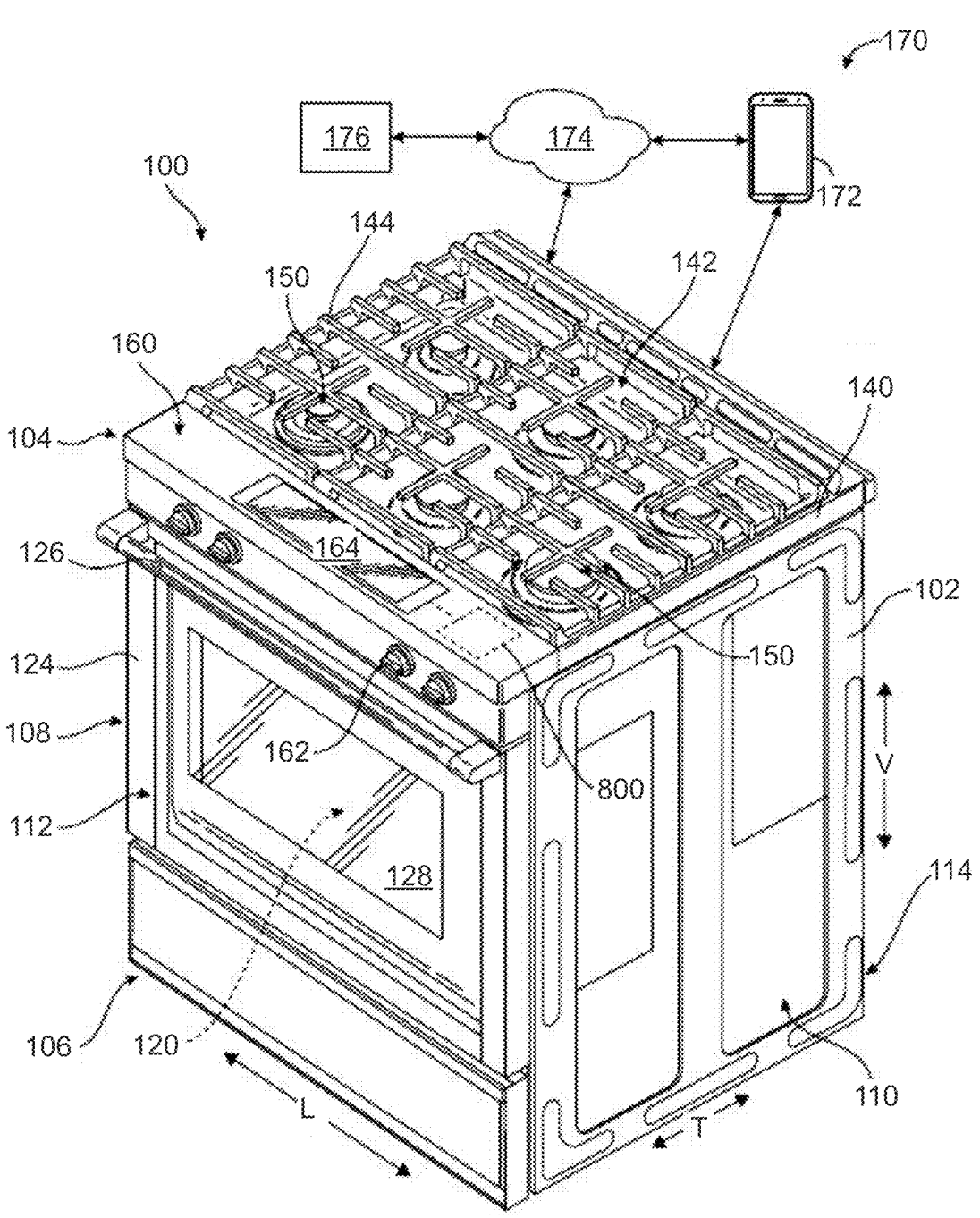
FIG. 1 illustrates a perspective view of an appliance according to example aspects of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Certain domestic appliances include electronic devices that require a constant power supply to function as intended. However, interruptions to the main voltage at the outlet may occur for many reasons (e.g., brownouts, blackouts). As such, some appliances immediately lose power upon the occurrence of an interruption to the main voltage, requiring the user to manually reset the appliance. If these interruptions are very brief, it may be beneficial for the appliance to remain powered on (e.g., in the same operating mode) through the interruption. Furthermore, some interruptions may have a duration that is long enough to initiate a power loss event (e.g., appliance shut down), yet short enough for the appliance to remain in the pre-interruption operating mode upon start up, allowing the appliance to automatically reset without causing a nuisance to the user.

One aspect of the present disclosure is directed to a power loss control system for an appliance. The power loss control system includes an AC presence detector configured to provide an AC presence signal indicative of a presence of an AC supply power. The power loss control system further includes a timing circuit configured to provide a timing signal indicative of a power loss interrupt time. The power loss control system further includes a controller configured to determine an operating mode of the appliance based at least in part on the AC presence signal indicating a power loss event and based at least in part on the timing signal.

Aspects of the present disclosure provide many technical effects and benefits. For example, the systems and methods described herein mitigate the nuisance of manually resetting an appliance after a brief interruption. Furthermore, the implementation of examples provided herein require small, low cost, high voltage capacitors, allowing the use of smaller capacitor packages (e.g., enabling smaller form factors). The use of these components lowers the cost of the system and reduces the amount of time in which rush current occurs. In addition, examples described herein provide a threshold value programed in software to determine whether or not to resume a previous operating mode. As such, this threshold value can be adjusted in the software and does not require changes to component values. Further, systems and methods provided herein can be easily and inexpensively implemented on any device capable of monitoring the status of the AC line.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

FIG. 1 provides a perspective view of an example appliance 100 as may be employed with the present subject matter. While appliance 100 is depicted as a cooking appliance (e.g., oven) in FIG. 1, those of ordinary skill in the art will understand that any domestic appliance may be used without deviating from the scope of the present disclosure. For example, appliances may include a refrigerator, a dishwasher, a microwave oven, a cooktop, an oven, a washing machine, a dryer, a water heater, a water filter or purifier, an air conditioner, a space heater, or any other household appliance which performs similar functions. Appliance 100 generally defines a vertical direction V, a lateral direction L, and a transverse direction T, each of which is mutually perpendicular, such that an orthogonal coordinate system is generally defined.

As illustrated, appliance 100 includes an insulated cabinet 102. Cabinet 102 of appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T. Within cabinet 102 is a single cooking chamber 120 which is configured for the receipt of one or more food items to be cooked. However, it should be appreciated that appliance 100 is provided by way of example only, and aspects of the present subject matter may be used in any suitable cooking appliance, such as a double oven range appliance. Thus, the example embodiment shown in FIG. 1 is not intended to limit the present subject matter to any particular cooking chamber configuration or arrangement. Indeed, aspects of the present subject matter may be applied to display assemblies for any suitable appliance.

Appliance 100 may further include a door 124 rotatably attached to cabinet 102 in order to permit selective access to cooking chamber 120. Handle 126 is mounted to door 124 to assist a user with opening and closing door 124 in order to access cooking chamber 120. As an example, a user can pull on handle 126 mounted to door 124 to open or close door 124 and access cooking chamber 120. One or more transparent viewing windows 128 (FIG. 1) may be defined within door 124 to provide for viewing the contents of cooking chamber 120 when door 124 is closed and also assist with insulating cooking chamber 120.

In general, cooking chamber 120 is defined by a plurality of chamber walls. Specifically, cooking chamber 120 may be defined by a top wall, a rear wall, a bottom wall, and two sidewalls. These chamber walls may be joined together to define an opening through which a user may selectively access cooking chamber 120 by opening door 124. In order to insulate cooking chamber 120, appliance 100 includes an insulating gap defined between the chamber walls and cabinet 102. According to an example embodiment, the insulation gap is filled with an insulating material, such as insulating foam or fiberglass, for insulating cooking chamber 120.

Appliance 100 may also include a cooktop 140. Cooktop 140 is positioned at or adjacent top 104 of cabinet 102 such that it is positioned above cooking chamber 120. Specifically, cooktop 140 includes a top panel 142 positioned proximate top 104 of cabinet 102. By way of example, top panel 142 may be constructed of glass, ceramics, enameled steel, and combinations thereof. One or more grates 144 are supported on a top surface of top panel 142 for supporting cooking utensils, such as pots or pans, during a cooking process.

Appliance 100 may further include one or more heating elements 150 for selectively heating cooking utensils positioned on grates 144 or food items positioned within cooking chamber 120. For example, referring to FIG. 1, heating elements 150 may be gas burners. Specifically, a plurality of heating elements 150 are mounted within or on top of top panel 142 underneath grates 144 that supports cooking utensils over the heating elements 150 while heating elements 150 provide thermal energy to cooking utensils positioned thereon, e.g., to heat food and/or cooking liquids (e.g., oil, water, etc.). heating elements 150 can be configured in various sizes so as to provide e.g., for the receipt of cooking utensils (i.e., pots, pans, etc.) of various sizes and configurations and to provide different heat inputs for such cooking utensils. According to alternative embodiments, appliance 100 may have other cooktop configurations or burner elements.

Appliance 100 further includes control panel assembly 160. For this example embodiment, control panel assembly 160 is positioned at a top 104 and front 112 of cabinet 102, e.g., above door 124 along the vertical direction V and forward of cooktop 140 along the transverse direction T. Control panel assembly 160 includes knobs 162 that are each associated with one of heating elements 150. In this manner, knobs 162 allow the user to activate each heating element 150 and determine the amount of heat input provided by each heating element 150 for cooking food items within cooking chamber 120 or on cooktop 140. Although shown with knobs 162, it should be understood that knobs 162 and the configuration of appliance 100 shown in FIG. 1 is provided by way of example only. More specifically, control panel assembly 160 may include various input components, such as one or more of a variety of touch-type controls, electrical, mechanical or electro-mechanical input devices including rotary dials, push buttons, and touch pads. Control panel assembly 160 may also be provided with one or more graphical display devices or display components, such as a digital or analog display device designed to provide operational feedback or other information to the user such as e.g., whether a particular heating element 150 is activated and/or the rate at which the heating element 150 is set. Indeed, according to the illustrated embodiment, control panel assembly 160 includes a display assembly 164, such as a liquid crystal display with an interactive display and interface.

Appliance 100 further includes controller 800. Controller 800 is configured to control high power loads of appliance 100. In addition, controller 800 may be in operative communication with control panel assembly 160 via, for example, one or more signal lines or shared communication busses, and signals generated in controller 800 operate appliance 100 in response to user input via user input devices, e.g., control knobs 162 and/or display assembly 164. Input/Output ("I/O") signals may be routed between controller 800 and various operational components of appliance 100 such that operation of appliance 100 can be regulated by controller 800. In addition, controller 800 may also be in communication with one or more sensors, such as temperature sensor 168, which may be used to measure temperature inside cooking chamber 120 and provide such measurements to the controller 800. Although temperature sensor 168 is illustrated at a top and rear of cooking chamber 120, it should be appreciated that other sensor types, positions, and configurations may be used according to alternative embodiments.

Controller 800 is a "processing device" or "controller" and may be embodied as described herein. Controller 800 may include a memory and one or more microprocessors, microcontrollers, application-specific integrated circuits (ASICS), CPUs or the like, such as general or special purpose microprocessors operable to execute programming instructions or micro-control code associated with operation of appliance 100, and controller 800 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 800 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

In some embodiments, appliance 100 may further include an external communication system 170. Referring still to FIG. 1, a schematic diagram of an external communication system 170 will be described according to an example embodiment of the present disclosure. In general, external communication system 170 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 170 may be used to transfer data or other information to improve performance of one or more external devices or appliances and/or improve user interaction with such devices.

For example, external communication system 170 permits controller 800 of appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with appliance 100 and/or external device 172 through network 174. In this regard, for example, remote server 176 may be a cloud-based server 176, and is thus located at a distant location, such as in a separate state, country, etc. According to an example embodiment, external device 172 may communicate with a remote server 176 over network 174, such as the Internet, to transmit/receive data or information, provide user inputs, receive user notifications or instructions, interact with or control appliance 100, etc. In addition, external device 172 and remote server 176 may communicate with appliance 100 to communicate similar information.

In general, communication between appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an example embodiment of the present subject matter. However, it should be appreciated that the example functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 2:
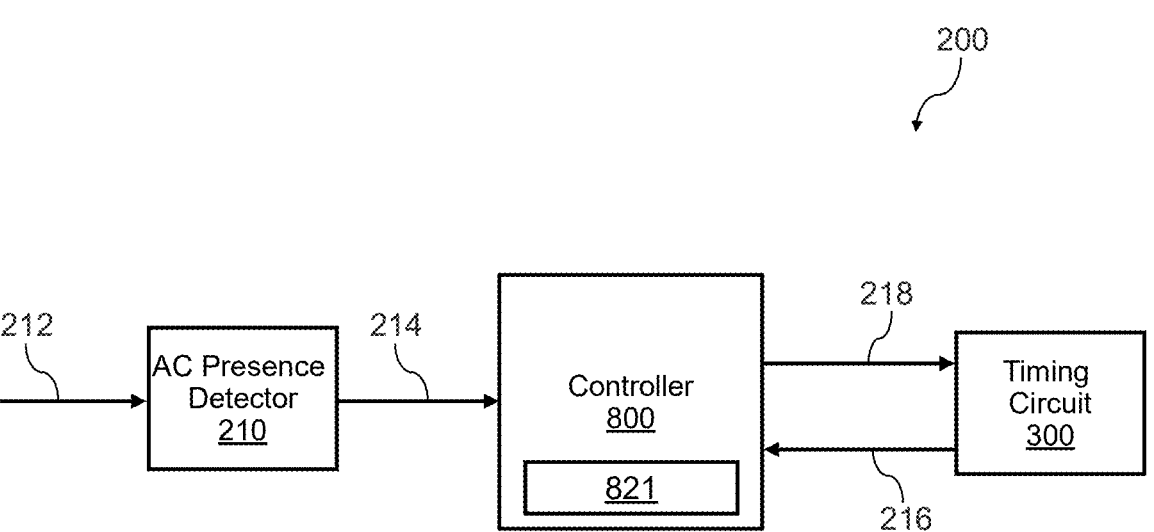
FIG. 2 depicts a block diagram of an example power loss control system according to example aspects of the present disclosure.

Referring now to FIG. 2, a block diagram of power loss control system 200 is shown. As shown in FIG. 2, power loss control system 200 may include an AC presence detector

210, a controller 800, and a timing circuit 300. In some embodiments, power loss control system 200 may be implemented in an appliance, such as appliance 100 depicted in FIG. 1. In addition, power loss control system 200 may be implemented in any domestic appliance. For example, domestic appliances may include a refrigerator, a dishwasher, a microwave oven, a cooktop, an oven, a washing machine, a dryer, a water heater, a water filter or purifier, an air conditioner, a space heater, or any other household appliance which performs similar functions.

Power loss control system 200 is configured to control power to an appliance during a power interrupt (e.g., power loss event). If the interruption is very brief, power loss control system 200 controls the appliance to remain powered on (e.g., in the same operating mode) through the interruption. Furthermore, if the interruption has a duration that is long enough that a power loss event (e.g., appliance shutdown) does occur, yet short enough for the appliance to remain in the pre-interruption operating mode upon start up, power loss control system 200 controls the appliance to automatically reset without causing a nuisance to the user.

AC presence detector 210 is configured to determine and provide an AC presence signal 214 to controller 800. AC presence signal 214 is indicative of the AC supply power 212. In some embodiments, AC supply power 212 may be the AC supply power of an appliance, such as appliance 100 illustrated in FIG. 1. For example, the AC supply power 212 may be provided from a residential power outlet or other power source which may provide conventional 60 Hz, 120-volt or 240-volt AC. As such, AC presence signal 414 may indicate the presence of an AC supply power. Specifically, AC presence signal 214 may be a binary signal indicating that either an AC supply power 212 is detected or that an AC supply power 212 is not detected. AC presence detector 210 is in communication with controller 800 such that controller 800 may receive AC presence signal 214 from AC presence detector 210.

Timing circuit 300 is configured to provide a timing signal indicative of a power loss interrupt time. As such, controller 800 may receive (e.g., read) the timing signal indicative of a power loss interrupt time from timing circuit 300. Further, controller 800 may be configured to control timing circuit 300 via timing control signal 218. In some embodiments, controller 800 may be configured to supply voltage to timing circuit 300 via timing control signal 218 based on AC presence signal 214.

As described below, controller 800 may be configured to continuously power an appliance during a brief interruption to power based on the AC presence signal 214. Furthermore, controller 800 is configured to restart the appliance in the previous operating mode based on timing signal 216 after a power loss event has occurred.

Figure 3:
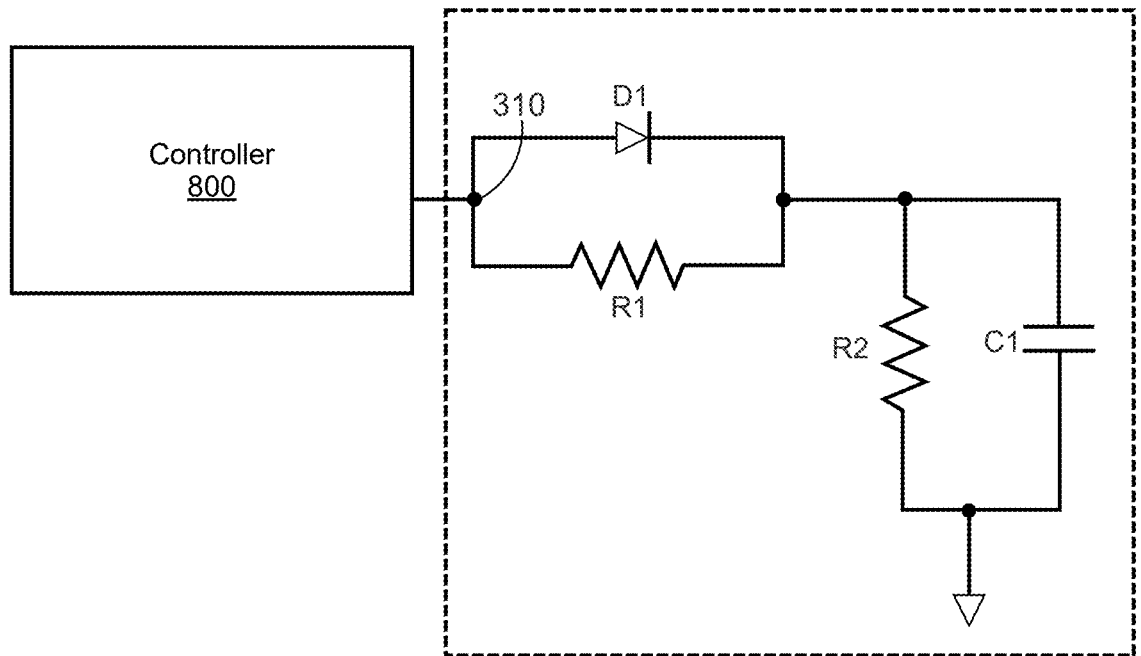
FIG. 3 depicts an example circuit schematic of an example timing circuit according to example aspects of the present disclosure.

Referring now to FIG. 3, a circuit schematic of a timing circuit according to example aspects of the present disclosure is shown. Although timing circuit 300 as shown in FIG. 3 is described in reference to power loss control system 200 of FIG. 2, those of ordinary skill in the art will understand that timing circuit 300 may be implemented in any suitable power loss control system.

As shown in FIG. 3, timing circuit 300 may be an RC circuit. For example, timing circuit 300 may include one or more resistors (R1, R2) and one or more capacitors (C1). As illustrated in FIG. 3, timing circuit 300 may further include a diode (D1).

Voltage may be supplied to timing circuit 300 at node 310 (e.g., timing control signal 218 of FIG. 2). For example, controller 800 may set the voltage level of timing circuit 300 by applying voltage at node 310. Specifically, voltage may be applied at node 310 such that capacitor C1 is charged to an initial voltage level through diode D1. As shown in FIG. 3, resistor R2 and capacitor C1 may be configured in parallel. When a power loss event occurs, voltage may no longer be applied at node 310. As such, the voltage level of timing circuit 300 may begin to dissipate at a time the power loss begins. Timing circuit 300 may further include resistor R1. Resistor R1 may be configured in parallel with diode D1, such that controller 800 can read timing signal 216 (as shown in FIG. 2) at node 310 upon start-up. As such, timing signal 216 may be indicative of the power-loss interrupt time. The power-loss interrupt time may be defined as the duration of the power loss event (e.g., the amount of time the power loss event lasted).

In some embodiments, the values for R2 and C1 may be used to set an RC time constant for timing circuit 300. In further embodiments, controller 800 may include internal protection diodes. As such, values for R1, R2, and C1 may be used to set an RC time constant for timing circuit 300.

Figure 4:
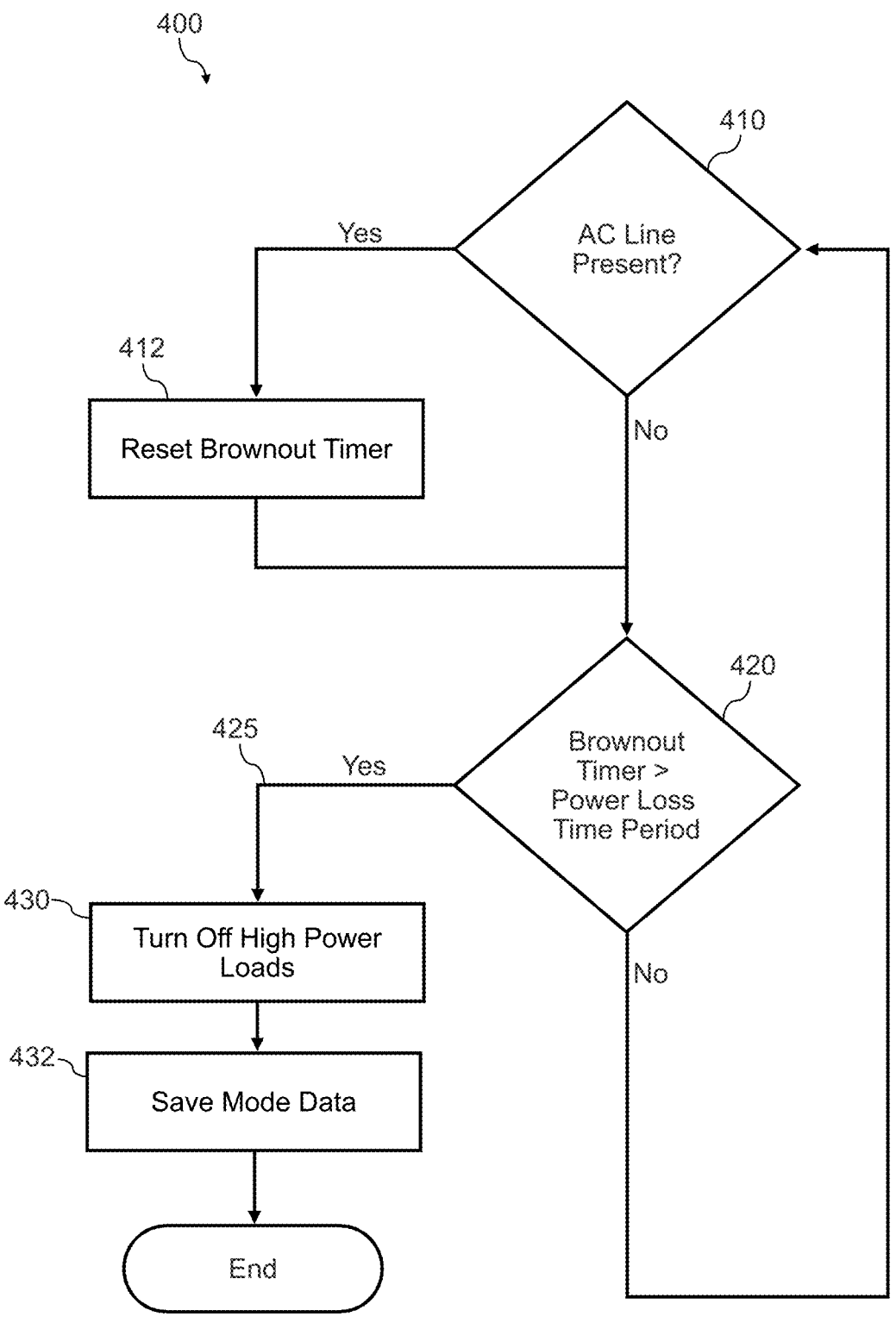
FIG. 4 depicts a flowchart of an example method for detecting a power loss event for an appliance.

Referring now to FIG. 4, a flowchart of method 400 for detecting a power loss event is illustrated. While method 400 is described with reference to power loss control system 200 as shown in FIG. 2 (e.g., controller 800 of system 200), those of ordinary skill in the art will understand that method 400 can be implemented with any suitable power loss control system. Furthermore, method 400 can be implemented by a power loss control system in an appliance, such as a refrigerator, a dishwasher, a microwave oven, a cooktop, a washing machine, a dryer, a water heater, a water filter, a water purifier, an air conditioner, or a space heater. As shown, method 400 may begin at 410.

At 410, method 400 may include determining that an AC supply power 212 is present. As described above in reference to FIG. 2, AC presence detector 210 may determine and provide an AC presence signal 214 indicative of an AC supply power 212 to controller 800.

As shown at 412, if AC supply power 212 is detected, a brownout timer may be reset. Alternatively, if AC supply power 212 is not detected, the brownout timer is not reset.

At 420, the brownout timer is compared to a power loss time period. If the brownout timer is less than the shutdown time period, method 400 returns to 410, and repeats. If the brownout timer is greater than the power loss time period, a power loss event has been detected 425. In some embodiments, the power loss time period may be defined as two or more AC line cycles of the AC supply power, such as two AC line cycles of the AC supply power 212. For example, if AC supply power 212 has a frequency of 60 Hz (e.g., 60 cycles per second), an AC line cycle of the AC supply power may define a period of about 16.7 milliseconds. As such, two AC line cycles may define a period of about 33.3 milliseconds. In some embodiments, the power loss time period may be saved in memory (e.g., non-volatile memory 821) of controller 800. In some embodiments, the shutdown time period may be adjusted by a user in software.

At 430, the high power loads are turned off (e.g., the appliance is shutdown). As shown, at 432, mode data (e.g., appliance state, appliance operating mode) is saved in memory (e.g., non-volatile memory 821). In some embodiments, the mode may be stored in non-volatile memory 821 (e.g., ROM, flash memory, etc.) of controller 800. Accordingly, mode data may be retained in non-volatile memory 821 at a time a power loss event occurs such that the appliance may be reset using the mode data (e.g., previous operating mode).

Figure 5:
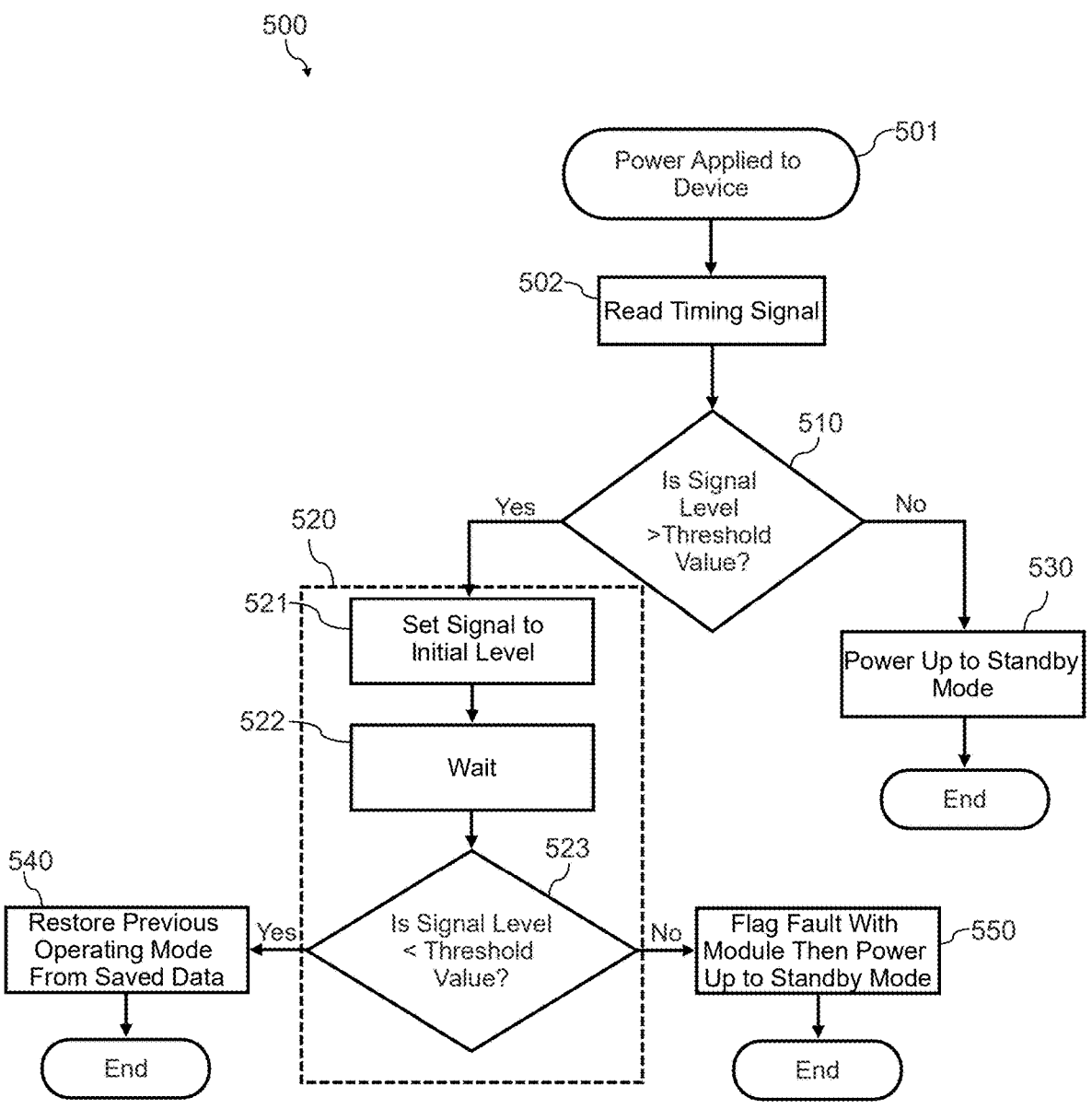
FIG. 5 depicts a flowchart of an example method for restarting an appliance.

Referring now to FIG. 5, a flowchart of method 500 for restarting an appliance after a power loss event is illustrated. While method 500 is described with reference to power loss control system 200 as shown in FIG. 2 (e.g., controller 800 of system 200), those of ordinary skill in the art will understand that method 500 can be implemented with any suitable power loss control system. In addition, method 500 can be implemented by a power loss control system in an appliance such as an oven, a refrigerator, a dishwasher, a microwave oven, a cooktop, a washing machine, a dryer, a water heater, a water filter, a water purifier, an air conditioner, or a space heater.

Method 500 begins with 501 as power is applied to the appliance. In some embodiments, 501 may be initiated at a time after a power loss event has been detected as shown at 425 of method 400 in FIG. 4. Upon power being applied to the appliance (e.g., controller 800 of the appliance), a timing signal indicative of a power-loss interrupt time is read at 502. Specifically, controller 800 may read timing signal 216. As described above, timing signal 216 is indicative of a power loss interrupt time (e.g., time period the power loss lasted).

510 includes comparing the timing signal to a threshold value. Specifically, timing signal 216 can be compared to a threshold value indicative of a power loss interrupt time threshold. In some embodiments, controller 800 may determine the threshold value based at least in part on a power loss interrupt time threshold that is set by a user and saved in memory (e.g., non-volatile memory). For example, a power loss interrupt time threshold of 3 seconds may set by a user. Controller 800 may then determine the threshold value that corresponds to a 3 second power loss interrupt time and compare signal 216 to said threshold value. In some embodiments, the threshold value indicative of a power loss interrupt time threshold is based at least in part on an RC time constant of timing circuit 300.

At 510, if the timing signal level is less than the threshold value (e.g., the duration of the power loss event was greater than the power loss interrupt time threshold), the appliance may be powered on to a standby mode at 530. During the standby mode, the appliance may remain in a state where it has reduced power consumption—but has not fully shut down. As such, the appliance may be ready to start up quickly upon receipt of an activation signal (e.g., from the controller). Alternatively, if the timing signal level is greater than the threshold value (e.g., the duration of the power loss event was less than the power loss interrupt time threshold), a fault condition of timing circuit 300 can be determined at 520 to indicate that the timing signal 216 is an accurate timing signal.

At 520 (e.g., 521, 522, 523), an operating mode of the appliance may be determined based on a fault condition of timing circuit 300. As shown, fault condition of timing circuit 300 can be determined to indicate that timing signal 216 (e.g., timing signal 216 shown at 510) is an accurate timing signal. For example, electrical connections and/or components (e.g., D1, C1, R1, R2 as shown in FIG. 3) of timing circuit 300 may be damaged. In such an example, timing signal 216 provided to controller 800 may not accurately indicate the power loss interrupt time. As such, the fault condition is configured to indicate that timing circuit 300 is operating correctly (e.g., capacitor C1 is dissipating voltage). Furthermore, the operating mode of the appliance may be determined based at least in part on the fault condition of timing circuit 300. For example, if the timing circuit 300 is not in a fault condition (e.g., timing circuit 300 is operating properly and timing signal 216 is accurate), the appliance may be restored to a previous operating mode at 540. If the timing circuit 300 is in a fault condition, the fault is flagged and the appliance is powered up to standby mode at 550.

As shown in FIG. 5, a fault condition of timing circuit 300 can be determined at 520 (e.g., 521, 522, 523). At 521, timing signal 216 may be set to an initial level. Specifically, controller 800 may set timing control signal 218 to an initial level (by applying voltage at node 310, charging capacitor C1 to the initial level). At 522, fault condition 520 may include waiting a set amount of time, allowing capacitor C1 to dissipate voltage.

523 includes comparing timing signal 216 to a threshold value after the set amount of time has past. As depicted at 523, if the voltage level of timing signal 216 is less than the threshold value (e.g., timing circuit 300 is operating correctly), the appliance may be restored to a previous operating mode at 540. If the voltage level of timing signal 216 is greater than the threshold value after the set amount of time, a fault may be flagged indicating that timing circuit 300 is not operating correctly, and the appliance may be powered on to a standby mode at 550.

The previous operating mode may be indicative of the operating mode of the appliance when the power loss event occurred. As described above in reference to FIG. 4, the previous operating mode may be saved to a non-volatile memory 821 of the appliance at 432 of method 400.

Referring now to FIG. 6, a flowchart of method 600 for restarting an appliance after a shutdown is provided. FIG. 6 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 600 is generally discussed with reference to appliance 100 described above with reference to FIG. 1 and power loss control system 200 described above with reference to FIGS. 2-3. However, those of ordinary skill in the art will understand that method 600 can be implemented with any suitable appliance and/or power loss control system. For example, method 600 may be implemented by any domestic appliance, such as an oven, a refrigerator, a dishwasher, a microwave oven, a cooktop, a washing machine, a dryer, a water heater, a water filter, a water purifier, an air conditioner, or a space heater.

At 601, method 600 may include detecting the power loss event based at least in part on an AC presence signal 214.

At 603, method 600 may include storing data indicative of a previous operating mode in a non-volatile memory when the power loss event occurred.

At 605, method 600 includes receiving, from a timing circuit 300, a timing signal 216 indicative of a power loss interrupt time.

At 607, method 600 may include determining a threshold value indicative of a power loss interrupt time threshold. As such, the operating mode of the appliance may be based at least in part on a comparison of the timing signal to the threshold value as shown at 510 of method 500 depicted in FIG. 5.

At 609, method 600 includes determining an operating mode of the appliance based at least in part on the timing signal 216.

At 611, method 600 includes restarting the appliance based on the operating mode.

Figure 7:
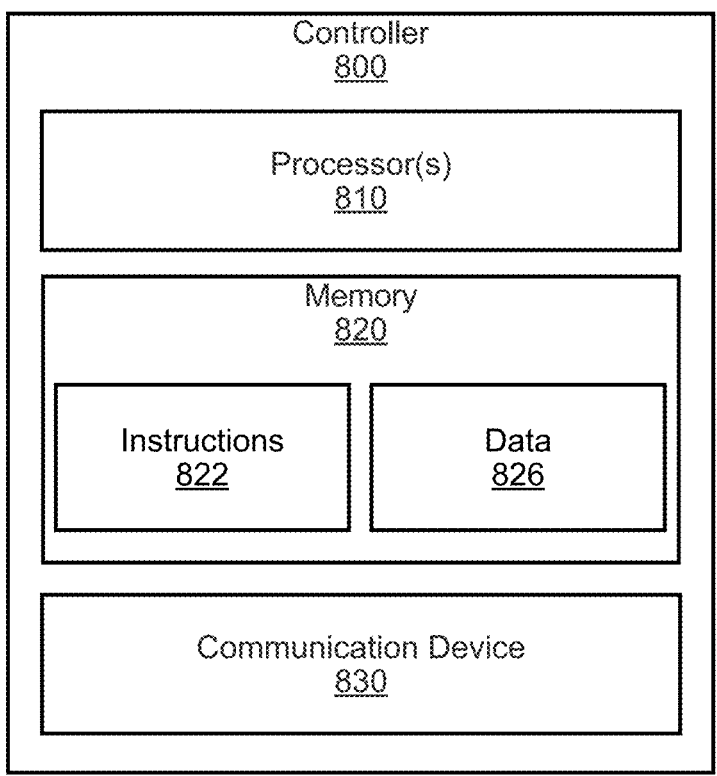
FIG. 7 depicts a block diagram of an example controller according to example embodiments of the present disclosure.

FIG. 7 depicts a block diagram illustrating an example controller 800 implemented in embodiments of the present disclosure. Furthermore, example methods described herein, such as those illustrated in FIGS. 4-6, may be implemented using the example controller of FIG. 7.

Embodiments of the controller 800 include one or more processor(s) 810, memory 820, and a communication device 830. The processor 810 may include a microprocessor, CPU or the like, such as a general or special purpose microprocessor operable to execute programming instructions or micro-control code. The processor 810 may operate to execute processes and/or functions described within the present disclosure. In some embodiments, processor 810 may execute programming instructions or micro-control code associated with operation of an appliance, such as appliance 100 shown in FIG. 1.

The memory 820 represents computer readable memory that is accessible to the controller 800. Memory 820 may represent random access memory such as DRAM, or read only memory such as ROM or FLASH. Accordingly, memory 820 may include a non-volatile memory 821 as depicted above in reference to FIG. 2. In one embodiment, the processor 810 executes programming instructions 822 stored in memory 820. Data 826 such as a previous operating mode may be saved in memory 820 and be accessible to the controller 800. Memory 820 may be a separate component from the processor 810 or may be included onboard within the processor 810. The communication device 830 provides a wired and/or wireless communications bus to send and/or receive signals.

One example aspect of the present disclosure is directed to a power loss control system for an appliance. The power loss control system includes an AC presence detector configured to provide an AC presence signal indicative of a presence of an AC supply power. The power loss control system further includes a timing circuit configured to provide a timing signal indicative of a power loss interrupt time. The power loss control system further includes a controller configured to determine an operating mode of the appliance based at least in part on the AC presence signal indicating a power loss event and based at least in part on the timing signal.

In some examples, the operating mode of the appliance is determined based at least in part on a comparison of the timing signal to a threshold value indicative of a power loss interrupt time threshold.

In some examples, the operating mode includes a previous operating mode indicative of the operating mode of the appliance when the power loss event occurred or a standby mode.

In some examples, the previous operating mode is saved in a non-volatile memory.

In some examples, the operating mode is based at least in part on the timing signal and a fault condition of the timing circuit.

In some examples, the appliance is an oven, a refrigerator, a dishwasher, a microwave oven, a cooktop, a washing machine, a dryer, a water heater, a water filter, a water purifier, an air conditioner, or a space heater.

In some examples, the power loss event occurs when an AC presence signal is not present for a power loss time period.

In some examples, the power loss time period comprises two or more AC line cycles.

In some examples, the timing circuit includes one or more resistors and one or more capacitors.

Another example aspect of the present disclosure is directed to a method for restarting an appliance after a power loss event. The method includes receiving, from a timing circuit, a timing signal indicative of a power loss interrupt time. The method further includes determining an operating mode of the appliance based at least in part on the power loss interrupt time. The method further includes restarting the appliance based on the operating mode.

In some examples, the method further includes determining a threshold value indicative of a power loss interrupt time threshold. The operating mode of the appliance is based at least in part on a comparison of the timing signal to the threshold value.

In some examples, the operating mode is based at least in part on the power loss interrupt time and a fault condition of the timing circuit.

In some examples, the operating mode includes a previous operating mode indicative of the operating mode of the appliance when the power loss event occurred or a standby mode.

In some examples, the method further includes detecting the power loss event based at least in part on an AC presence signal. In some examples, the method further includes storing data indicative of the previous operating mode in a non-volatile memory when the power loss event occurred.

In some examples, the power loss event is detected when an AC presence signal is not present for a power loss time period.

In some examples, the power loss time period comprises two or more AC line cycles.

In some examples, the appliance is an oven, a refrigerator, a dishwasher, a microwave oven, a cooktop, a washing machine, a dryer, a water heater, a water filter, a water purifier, an air conditioner, or a space heater.

In some examples, the timing circuit includes one or more resistors and one or more capacitors.

Another example aspect of the present disclosure is directed to an appliance. The appliance includes a power loss control system. The power loss control system includes an AC presence detector configured to provide an AC presence signal indicative of a presence of an AC supply power. The power loss control system further includes a timing circuit configured to provide a timing signal indicative of a power loss interrupt time. The power loss control system further includes a controller configured to determine an operating mode of the appliance based at least in part on the AC presence signal indicating a power loss event and based at least in part on the timing signal.

In some examples, the appliance is an oven, a refrigerator, a dishwasher, a microwave oven, a cooktop, a washing machine, a dryer, a water heater, a water filter, a water purifier, an air conditioner, or a space heater.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A power loss control system for an appliance, comprising:
    an AC presence detector configured to provide an AC presence signal indicative of a presence of an AC supply power;
    a timing circuit configured to provide a timing signal indicative of a power loss interrupt time; and
    a controller configured to:
        determine an operating mode of the appliance based at least in part on the AC presence signal indicating a power loss event, on the timing signal, and a fault condition of the timing circuit;
        determine the fault condition is present based on the timing signal being less than a timing threshold value; and
        direct the appliance to the operating mode that includes a standby mode in response to the fault condition being present.

2. The system of claim 1, wherein the operating mode of the appliance is determined based at least in part on a comparison of the timing signal to a threshold value indicative of a power loss interrupt time threshold.

3. The system of claim 1, wherein the operating mode comprises:
    a previous operating mode indicative of the operating mode of the appliance when the power loss event occurred free of a fault event.

4. The system of claim 1, wherein the appliance is an oven, a refrigerator, a dishwasher, a microwave oven, a cooktop, a washing machine, a dryer, a water heater, a water filter, a water purifier, an air conditioner, or a space heater.

5. The system of claim 1, wherein the power loss event occurs when an AC presence signal is not present for a power loss time period.

6. The system of claim 1, wherein the timing circuit includes one or more resistors and one or more capacitors.

7. The system of claim 3, wherein the previous operating mode is saved in a non-volatile memory.

8. The system of claim 5, wherein the power loss time period comprises two or more AC line cycles.

9. A method for restarting an appliance after a power loss event, the method comprising:
    receiving, from a timing circuit, a timing signal indicative of a power loss interrupt time;
    determining an operating mode of the appliance based at least in part on the power loss interrupt time, the timing signal, and a fault condition of the timing circuit;
    determining the fault condition is present based on the timing signal being less than a timing threshold value; and
    directing the appliance to the operating mode that includes a standby mode in response to the fault condition being present; and
    restarting the appliance in the standby operating mode based on the fault condition.

10. The method of claim 9, further comprising:
    determining a threshold value indicative of a power loss interrupt time threshold,
    wherein the operating mode of the appliance is based at least in part on a comparison of the timing signal to the threshold value.

11. The method of claim 9, wherein the operating mode is based at least in part on the power loss interrupt time and a fault condition of the timing circuit.

12. The method of claim 9, wherein the operating mode comprises:

a previous operating mode indicative of the operating mode of the appliance when the power loss event occurred free from a fault condition.

13. The method of claim 9, wherein the appliance is an oven, a refrigerator, a dishwasher, a microwave oven, a cooktop, a washing machine, a dryer, a water heater, a water filter, a water purifier, an air conditioner, or a space heater.

14. The method of claim 9, wherein the timing circuit includes one or more resistors and one or more capacitors.

15. The method of claim 12, further comprising:

detecting the power loss event based at least in part on an AC presence signal; and storing data indicative of the previous operating mode in a non-volatile memory when the power loss event occurred.

16. The method of claim 12, wherein the power loss interrupt time comprises two or more AC line cycles.

17. An appliance, the appliance comprising:

a power loss control system, comprising:

an AC presence detector configured to provide an AC presence signal indicative of a presence of an AC supply power;

a timing circuit configured to provide a timing signal indicative of a power loss interrupt time; and a controller configured to;

determine an operating mode of the appliance based at least in part on the AC presence signal indicating a power loss event, the timing signal, and a fault condition of the timing circuit;

determine the fault condition is present based on the timing signal being less than a timing threshold value; and direct the appliance to the operating mode that includes a standby mode in response to the fault condition being present.

18. The appliance of claim 17, wherein the appliance is an oven, a refrigerator, a dishwasher, a microwave oven, a cooktop, a washing machine, a dryer, a water heater, a water filter, a water purifier, an air conditioner, or a space heater.

* * * * *